United States Patent [19]

Souplet et al.

[11] Patent Number: 4,638,976
[45] Date of Patent: Jan. 27, 1987

[54] ROTARY GATE VALVE GASKET AND PROCESS FOR ITS MANUFACTURE

[75] Inventors: Robert Souplet, Nancy; Jean Sutter, Villers les Nancy, both of France

[73] Assignee: Pont-a-Mousson S.A., France

[21] Appl. No.: 748,062

[22] Filed: Jun. 24, 1985

[30] Foreign Application Priority Data

Jun. 27, 1984 [FR] France ............................... 84 10289

[51] Int. Cl.$^4$ ............................................. F16K 25/00
[52] U.S. Cl. ..................................... 251/173; 251/306
[58] Field of Search ................. 251/173, 305, 306, 174

[56] References Cited

U.S. PATENT DOCUMENTS

| | | | |
|---|---|---|---|
| 3,734,457 | 5/1973 | Roos | 251/306 |
| 4,120,482 | 10/1978 | Cox | 251/306 |
| 4,176,675 | 12/1979 | Liberman | 251/306 |
| 4,289,296 | 9/1981 | Krause | 251/306 |
| 4,396,199 | 8/1983 | Boyd et al. | 251/306 |
| 4,398,695 | 8/1983 | Torche | 251/306 |

FOREIGN PATENT DOCUMENTS 1203029 8/1970 United Kingdom ............... 251/173

Primary Examiner—Martin P. Schwadron
Assistant Examiner—Sheri M. Novack
Attorney, Agent, or Firm—Sughrue, Mion, Zinn, Macpeak, and Seas

[57] ABSTRACT

A gasket for a rotary gate valve is made from a material that can be utilized only after sintering, such as a fluorocarbon polymer, and comprises a ring-shaped solid portion 15 surrounded by a coaxial, annular flange 16 for anchoring the gasket within the valve body. A closed chamber 23 is provided in the solid portion of the gasket and houses an elastic ring 28. In manufacturing the gasket an annular ring is formed comprising the solid portion 15, an axial groove 23, an axial tab 29, and a radial tab 30. The elastic ring 28 is then inserted in the axial groove, and the tabs 29 and 30 are pressed together to form the annular flange 16 and fully enclose the ring 28.

8 Claims, 23 Drawing Figures

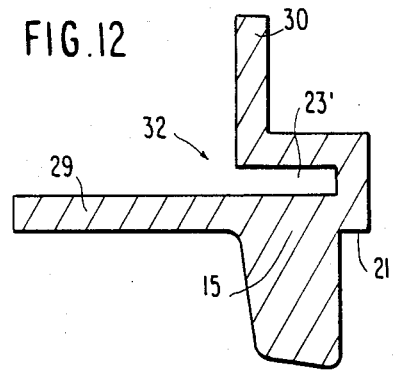
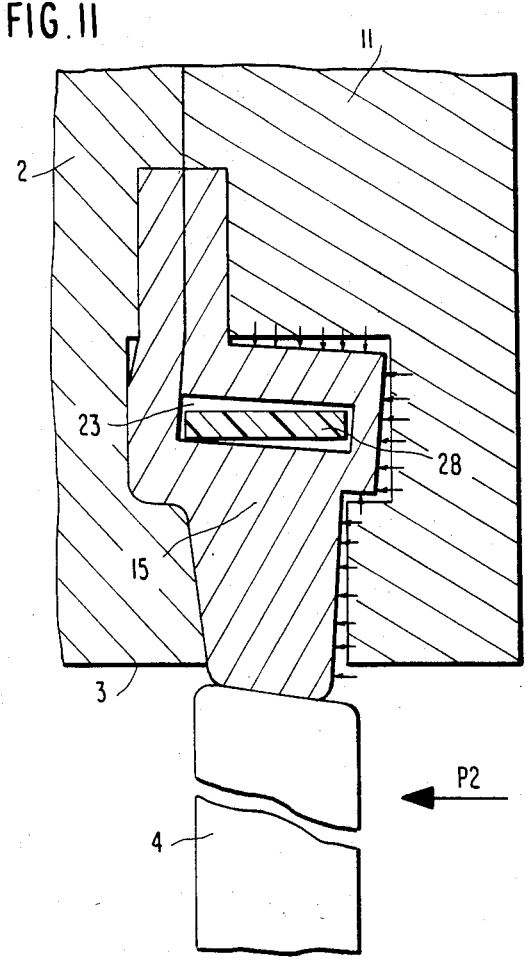
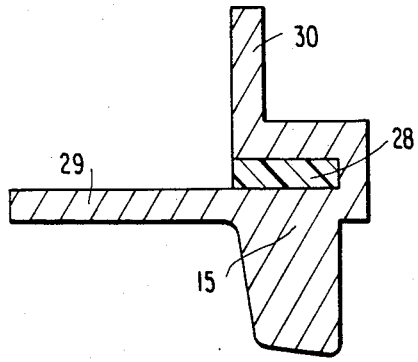
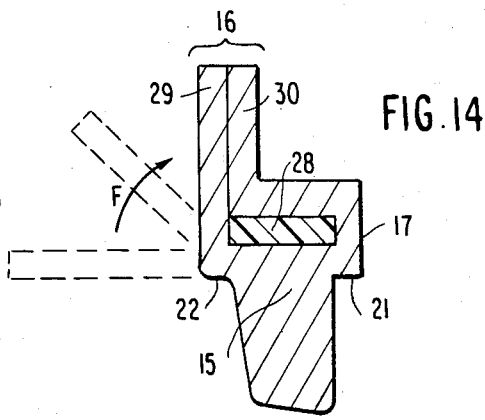

4,638,976

ROTARY GATE VALVE GASKET AND PROCESS FOR ITS MANUFACTURE

BACKGROUND OF THE INVENTION

This invention concerns a valve gasket and a process for its manufacture. More particularly, it concerns a gasket that resists high temperatures and pressures designed for a rotary gate valve.

Generally, an elastic gasket, which may be made of an elastomer, is used to form the seal between a valve and its pivoting gate. Gaskets of this type perform this function properly when the temperature of the fluid flowing through the valve does not exceed 120° C., when the pressure is less than about 20 bars, and when the fluid does not degrade the material from which the gasket is made.

When the conditions of use become more severe as a result of higher temperatures, high pressures, and greater corrosiveness of the liquid being carried, however, elastomer gaskets are no longer suitable. In such cases other materials are used, such as fluorocarbon polymers, of which the best known is polytetrafluoroethylene (PTFE). These materials are inert with respect to many fluids and can also withstand much higher pressures and temperatures than elastomeric materials. However, such fluorocarbon polymers have several drawbacks. After they have been deformed they regain their initial shape only very slowly, and when they are subjected to prolonged deformation, either through compression or traction, they become quasipermanently deformed, a phenomenon known by the name of gasket creep. As a result, when a gasket is compressed for a long period between the valve body and the gate, it gradually becomes deformed and no longer provides a proper seal. A known method of preventing this phenomenon is to surround the gasket with one or more elastic rings that prevent radial creep. Reinforced in this way, the gasket produces a satisfactory seal. However, when the fluid flowing through the valve is corrosive to ordinary metals, the elastic rings reinforcing the gasket must be made of corrosion-resistant noble metals. This greatly increases the cost of producing the gasket.

One way of getting around this drawback consists of embedding the elastic rings within the gasket material, e.g., by double molding. This known technique is easy to use when the gasket is made of an elastomer, since elastomers mold easily. On the other hand, the same technique cannot be used when the gasket is made of pure PTFE or is mixed with a filler such as carbon powder or stainless steel powder. Producing a PTFE part involves a process of sintering that consists of compacting a powder in a mold under very high pressure, followed by the heating of the molded part to melt together the grains of compacted powder. As a result of the special technique required for the production of PTFE parts the double molding of an elastic ring inside a gasket presents almost insurmountable difficulties since, when the powder is compacted, the ring moves and its position becomes unknown. Furthermore, during the heating the gasket and ring become deformed in an uncontrolled manner, since the expansion coefficient of PTFE is about ten times higher than that of the material making up the ring.

SUMMARY OF THE INVENTION

Applicants thus set about to produce a fluorocarbon polymer gasket equipped with an elastic ring that would prevent cold creep and which would have good mechanical qualities when used with hot fluids.

The invention concerns a valve gasket having a body that forms an axial channel within which a rotary gate is disposed. Said gasket is made of a material such as a fluorocarbon polymer that can be utilized only by sintering. It comprises a circular, ring-shaped solid portion and a coaxial, ring-shaped flange designed to be mounted within a machined groove, partially within the valve body and partially within an annular retaining ring that is coaxial with the valve body. This groove includes a wide portion opening into the axial channel of the valve body, and a narrow portion inside which the annular flange of the gasket is clamped. The gasket further comprises an elastic ring that holds the solid portion of the gasket against the valve gate. This elastic ring is housed within a closed chamber provided in the solid portion of the gasket.

The invention further concerns a process for manufacturing a gasket as defined above. According to this process:

(a) an annular ring is produced of filled or unfilled fluorocarbon polymer having a solid portion, in which an axial channel is provided, and two tabs, (b) an elastic ring is placed in axial translation within the channel in the annular ring, and (c) one of the tabs is brought into contact with the other.

BRIEF DESCRIPTION OF THE DRAWINGS

FIG. 11 is a large-scale radial cross-section showing the position of the gasket of FIG. 10 in its groove when fluid pressure is exerted downstream from the gate, FIGS. 12, 13, and 14 are radial cross-sections that schematically represent the process of manufacturing the gasket of the invention.

DETAILED DESCRIPTION OF THE PREFERRED EMBODIMENTS

Figure 1:
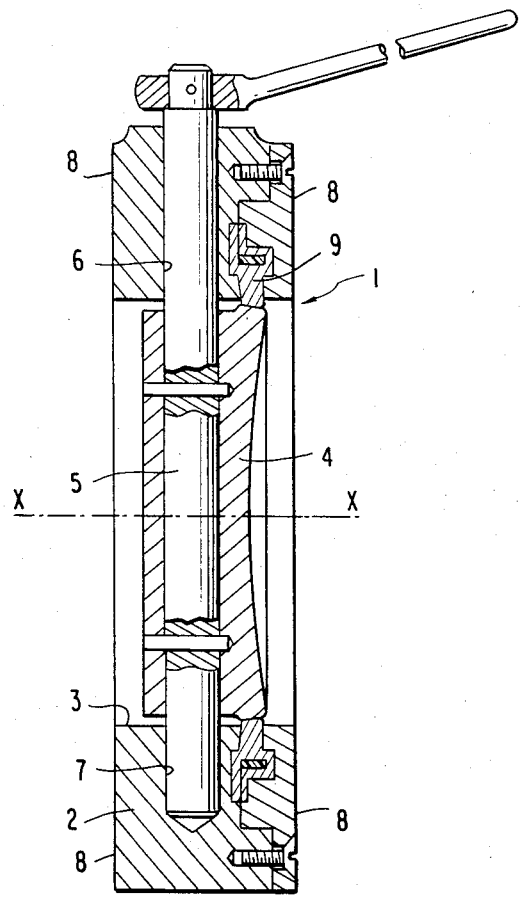
FIG. 1 is a diametral cross-section of a butterfly valve equipped with the gasket of the invention.
Figure 2:
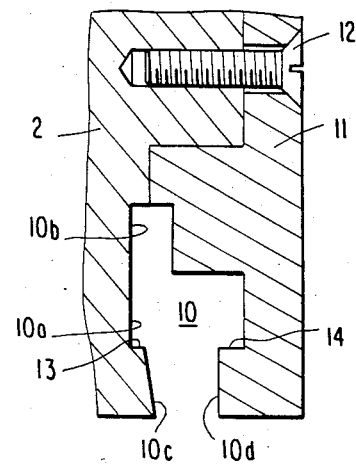
FIG. 2 is a partial radial cross-section, enlarged in scale, of a groove in the valve intended to hold the gasket.

Butterfly valve 1 in FIG. 1 comprises a body 2 containing an axial channel 3 with axis X—X that may be closed using a gate 4 fastened to a rotary shaft 5 that turns within two diametrically opposite boreholes 6 and 7 in body 2. Body 2 terminates in two parallel, flat, annular surfaces 8 by which the valve is fastened to the two flanges (not shown) of the adjacent sections of a pipe system. Fluid may flow through axial channel 3 in either direction. An elastic gasket conforming to the invention is disposed within a groove 10, shown in FIG. 2, machined partially in body 2 and partially within an annular retaining ring 11 fastened to body 2 by countersunk screws 12. Groove 10 comprises a wide portion 10a opening into axial channel 3 and a narrower, blind portion 10b that is oriented radially toward the outside of the valve. Wide portion 10a of the groove is provided with two shoulders 13 and 14 that protrude outward at the point of opening into channel 3. Shoulder 14 is formed by the transition from one radial surface 10d adjacent to channel 3 to one of the radial lateral surfaces of the wide portion 10a of groove 10, while shoulder 13 is formed by the transition from a tapered surface 10c adjacent to channel 3 to the other radial lateral surface of the wide portion 10a of the groove.

Figure 3:
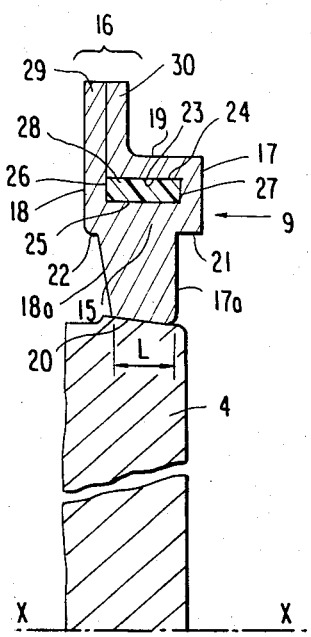
FIG. 3 is a partial radial cross-section, also in enlarged scale, of the gasket engaging the gate.

Elastic gasket 9, as shown in FIG. 3, consists of a solid portion 15 in the shape of a circular ring, the outer edge of which is circled by an annular flange 16.

The solid portion 15 of the gasket is defined laterally by two parallel radial surfaces 17 and 18 that are connected through shoulders 21 and 22 to a radial surface 17a and a tapered surface 18a having the same conicity as surface 10c of groove 10. It is defined radially toward the outside by an axial surface 19 perpendicular to surfaces 17 and 18, and toward the inside by a tapered surface 20 having axis of rotation X—X. When flow channel 3 is closed, gate 4 is in contact with the gasket along the tapered surface 20. Shoulders 21 and 22 contact corresponding shoulders 13 and 14 of the wide portion of the groove. They hold gasket 9 inside groove 10 in the event the normal retention means, consisting of flange 16 clamped within narrow portion 10b of the groove, fails.

Solid portion 15 defines a closed chamber 23 having two axial surfaces 24 and 25 parallel to outer surface 19 of gasket 9, and two parallel surfaces 26 and 27 perpendicular to surfaces 24 and 25. The length of surfaces 24 and 25 is at least as great as the length L of the axial projection of contact surface 20 between gasket and gate. Within chamber 23 is disposed an elastic ring 28, the dimensions of which are such that it occupies all of the space provided by chamber 23 without any play.

As shown in FIG. 3, the entire contact surface 20 between gasket and gate is belted by this elastic ring 28, which plays the role of a hoop. The ring may be made either from a metal having the necessary modulus of elasticity, or from a composite material such as a polymer resin reinforced with glass or carbon fiber.

Annular flange 16 radially encircles surface 19 of solid portion 15 of the gasket. It is formed by joining tabs 29 and 30, the former being an extension of radial surface 18 and the latter being perpendicular to axial surface 19 of the same solid portion.

Figure 4:
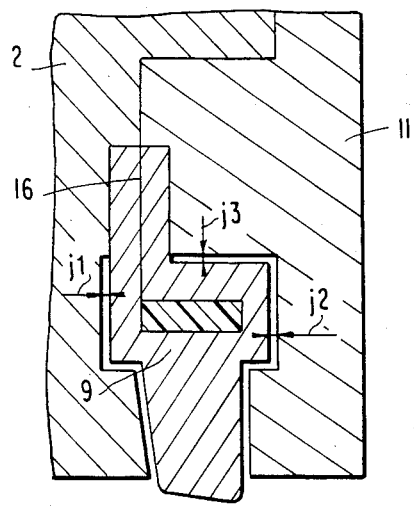
FIG. 4 is a partial radial cross-section, in enlarged scale, of the gasket seated in its groove.
Figure 5:
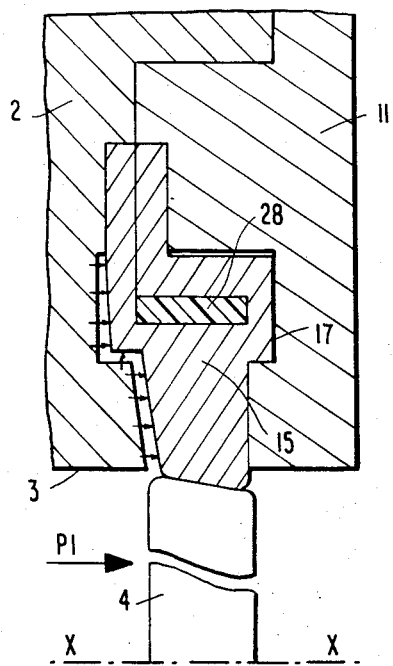
FIG. 5 is a large-scale radial cross-section showing the position of the gasket in its groove when fluid pressure is exerted upstream of the gate.

The gasket functions as follows. As shown in FIG. 4, gasket 9 is deployed in groove 10. Flange 16, disposed in narrow groove portion 10b is clamped between valve body 2 and retaining ring 11, fastening or anchoring the gasket within the groove. Axial (j1 and j2) and radial (j3) clearance is provided between solid portion 15 of the gasket and wide portion 10a of the groove. When, as shown in FIG. 5, gate 4 closes off channel 3 and fluid pressure is exerted on the upstream side of the gate in the direction of arrow P1, the fluid penetrates through axial clearance j1 and presses surface 17 of the gasket against the corresponding bearing surface formed by retaining ring 11, and tends to deform gate 4 in the direction of arrow P1. As a result of this deformation, the solid portion 15 of the gasket is compressed between gate 4 and elastic ring 28, which prevents it from creeping. A good seal between gasket and gate is thereby obtained.

Figure 6:
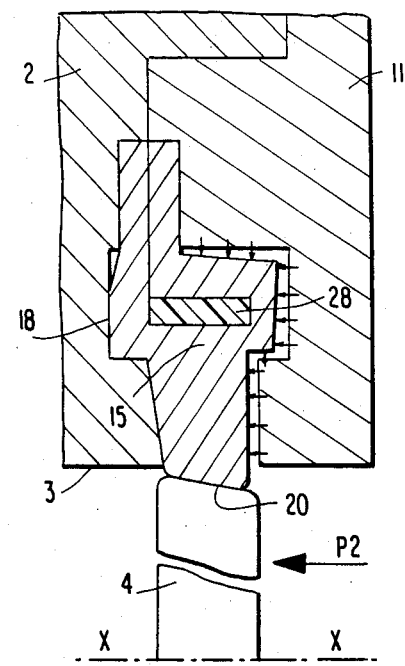
FIG. 6 is a large-scale radial cross-section showing the position of the gasket in its groove when fluid pressure is exerted downstream from the gate.

When, as shown in FIG. 6, fluid pressure is exerted on the downstream side of the gate in the direction of arrow P2, the fluid enters through axial clearance j2 and radial clearance j3. As a result, the gasket is subjected to an axial thrust that forces radial surface 18 against the corresponding bearing surface of valve body 2, and a radial thrust that forces surface 20 against gate 4. In this case, too, the solid portion of the gasket is compressed between gate 4 and elastic ring 28, which prevents creep. The action of the fluid moving between surface 19 of solid portion 15 of the gasket and retaining ring 11 increases the force of application of surface 20 of solid portion 15 against gate 4.

Figure 7:
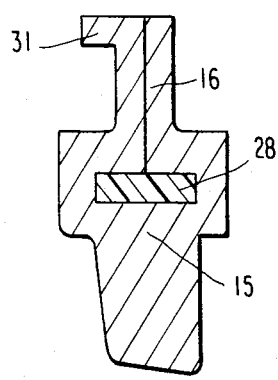
FIG. 7 is a large-scale radial cross-section of a first variant of the gasket.

In the variant shown in FIG. 7, radial annular flange 16 is no longer eccentric with respect to solid portion 15 of the gasket, but is centered with respect to the latter.

Figure 8:
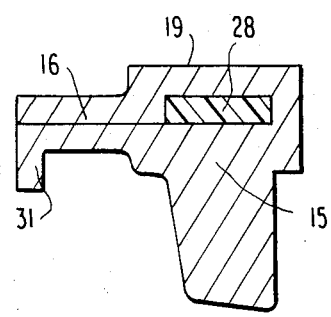
FIG. 8 is a large-scale radial cross-section of a second variant of the gasket.

In the variant shown in FIG. 8, annular flange 16 is axial rather than radial, and is an extension of outer surface 19 of the solid portion of the gasket.

Figure 9:
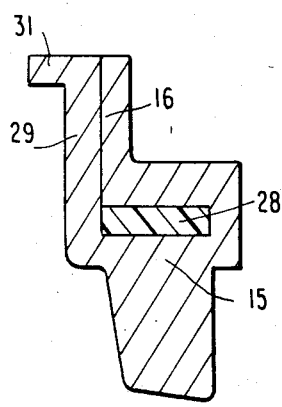
FIG. 9 is a large-scale radial cross-section of a third variant of the gasket.

In the variant shown in FIG. 9, tab 29 of flange 16 has a heel 31 perpendicular to the tab, thus ensuring a better grip of the valve body by gasket 9.

Figure 10:
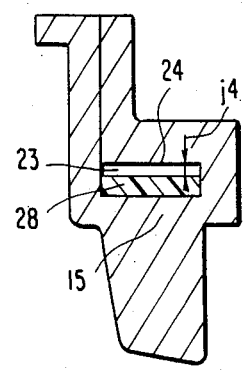
FIG. 10 is a large-scale radial cross-section of a fourth variant of the gasket.

Finally, in the variant shown in FIG. 10, the radial width of chamber 23 in the solid portion of the gasket is greater than the thickness of the elastic ring disposed within the chamber. As a result there is a clearance j4 between the outer surface of ring 28 and the outer surface 24 of chamber 23. When, as shown in FIG. 11, fluid pressure is exerted on the downstream side of the gate in the direction of arrow P2, the fluid, as mentioned above, exerts both axial and radial thrust against solid portion 15 of the gasket. By virtue of the clearance j4 between elastic ring 28 and chamber 23, solid portion 15 can pivot under the effect of the fluid pressure, making a slight rotational movement about elastic ring 28, which brings tapered surface 18a of the gasket into contact with corresponding surface 10c of the groove. The result is an increase in the gasket-gate contact pressure, which improves the seal.

The variants represented in FIGS. 7, 8, and 10 may also be equipped with a gripping heel 31, as shown.

The various phases of manufacturing the gasket of FIGS. 1–6 are shown in FIGS. 12 to 14. From a PTFE ring, which may be filled with carbon powder or stainless steel powder, an annular ring 32 is formed having a cross-section as shown in FIG. 12. This ring comprises a solid portion 15 having a shoulder 21, an axial groove 23', an axial tab 29, and a radial tab 30. An elastic ring 28, the area of which is just slightly less than that of groove 23', is then inserted into the groove as shown in FIG. 13. Finally, axial tab 29 is folded over in the direction of arrow F, as shown in FIG. 14, so that it is applied against radial tab 30. The two tabs 29, 30 join to form annular flange 16. This folding is performed in the following manner.

Figure 15:
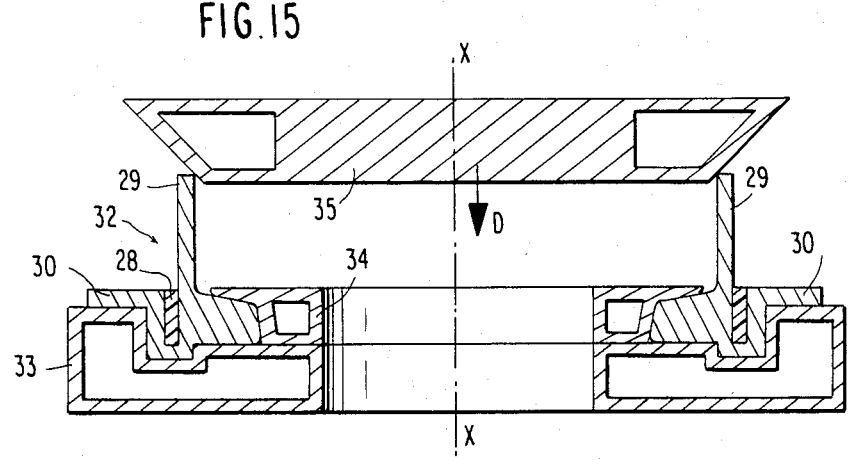
FIGS. 15, 16, and 17 are radial cross-sections representing the manufacture of a gasket and the tooling used.
Figure 16:
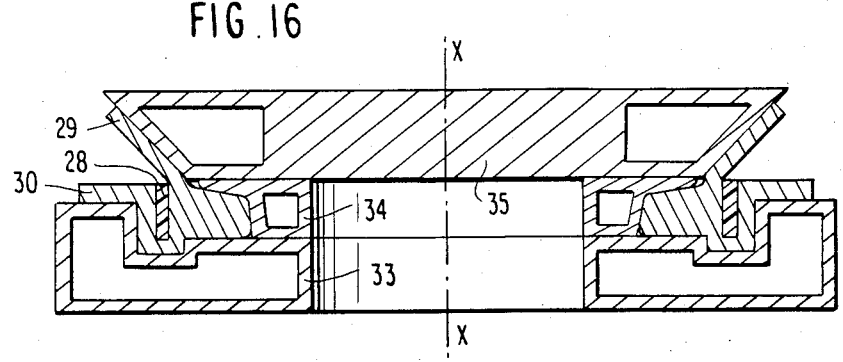
Figure 17:
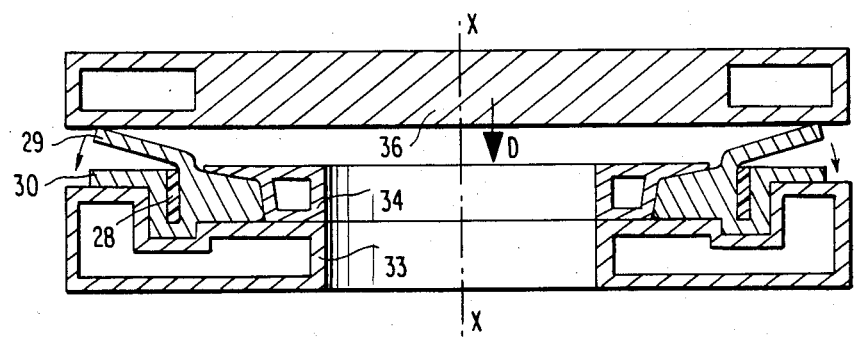
Figure 18:
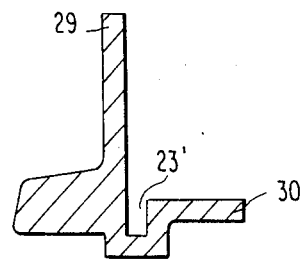
FIGS. 18, 19, 20, and 21 are radial cross-sections that schematically represent the process of manufacturing the variant shwon in FIG. 7, and FIGS. 22 and 23 are radial cross-sections that schematically represent the process of manufacturing the variant of FIG. 8.
Figure 19:
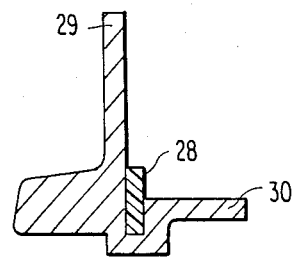

As shown in FIG. 15, ring 32, after the insertion of elastic ring 28, is placed on an annular heating plate 33 that matches its exterior shape. A heating form 34, resting on plate 33, is disposed inside fabricated ring 32. Plate 33 and form 34 are hollow and are heated either by circulation of hot fluid or by electric resistances. Plate 33 and form 34 are heated to between 250° and 300° C., with the temperature depending on the nature of the material making up ring 32 (pure fluorocarbon or one mixed with carbon powder or stainless steel powder). Ring 32 is heated by thermal conduction through plate 33 and form 34, which serve simultaneously to hold it in place. A tool 35 with a tapered shape generated by revolution, coaxial with ring 32 and heated to the same temperature as plate 33 and form 34, is lowered within the cylinder formed by tab 29 and is displaced by translational motion along axis X—X in the direction shown by arrow D. Under the pressure of tool 35, axial tab 29 is deformed outwardly until it occupies an intermediate position as shown in FIG. 16. In this position tab 29 is inclined at about 40° to the horizontal and its entire length is in contact with the tapered portion of tool 35. The latter tool is then withdrawn and replaced with a second, flat tool 36, also heated, which moves in translation along axis X—X in the direction of arrow D as shown in FIG. 17, and bends tab 29 from its inclined position against radial tab 30, thus giving the gasket its final form. Plate 33, form 34, and tool 36 are then cooled and gasket 9 is removed from plate 33 and form 34.

Figure 20:
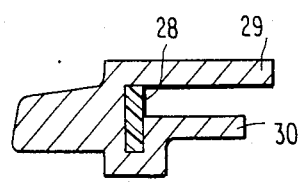
Figure 21:
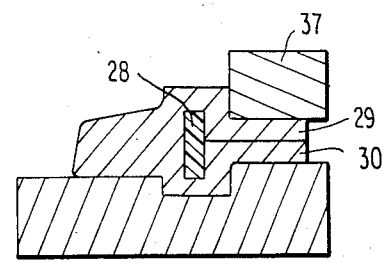

The different phases of production of the gasket variant shown in FIG. 7, in which annular flange 16 is centered with respect to solid portion 15 of the gasket, are shown in FIGS. 18 through 21. Starting with an annular ring, the radial tab 30 which is essentially an extension of radial surface 17a of solid portion 15 (FIG. 18), ring 28 (FIG. 19) is inserted into groove 23' and the tooling described above is used to achieve an intermediate configuration in which tabs 29, 30 are parallel but not yet in contact (FIG. 20). A third heated tool 37 shaped like a circular crown is then used to force tab 29 up against tab 30, which is held stationary (FIG. 21).

Figure 22:
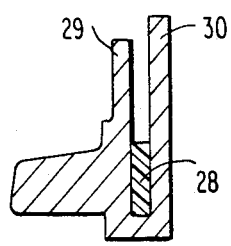
Figure 23:
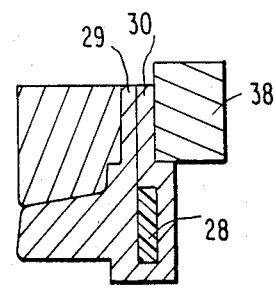

To obtain the variant gasket shown in FIG. 8 in which annular flange 16 is axial, one starts with an annular ring such as that shown in FIG. 22, the tabs 29, 30 of which are parallel and form a groove into which elastic ring 28 is inserted. After the latter has been inserted, a heating element in the shape of a circular crown 38 forces outer tab 30 against inner tab 29, which is held stationary. This forms an axially oriented flange (FIG. 23).

The gasket of the invention has the following advantages:

(a) it simultaneously possesses the characteristics of chemical inertness and temperature resistance due to the material from which it is made (fluorocarbon polymers), and of elasticity, due to the presence of the elastic ring contained within the gasket, (b) it functions as an automatic seal, whether the fluid pressure is exerted on the upstream or downstream side of the gate, (c) the elastic ring, which is placed in a closed chamber in the solid portion of the gasket, is not in contact with the fluid flowing through the valve, which is advantageous when the fluid is corrosive. As a result, it is not necessary to use a costly, corrosion-resistant metal for the elastic ring, and (d) the manufacturing process makes it possible to produce a geometrically exact gasket that is economical at the same time.

What is claimed is;

1. A gasket for a valve (1) having a body (2) surrounding an axial fluid flow channel (3) with an axis X—X, a rotary gate (4) mounted within the body (2) on a shaft (5), and adapted to rotate between a channel open and channel closed position, the body having a first contoured surface formed in one face thereof, and an annular retaining ring (11) disposed coaxial with the body and having a shaped surface adapted to form a groove (10) when mated with the body, the groove having a wide portion (10a) opening into the axial channel (3) and a first narrow portion (10b), said gasket comprising:

a solid portion (15) in the shape of a circular ring having the axis X—X and a coaxial annular flange portion (16) contiguous with said solid portion and having a first and a second member (29, 30) extending outwardly from the solid portion and configured, when adjacent to each other, to fit tightly within said groove, an elastic ring (28) having a substantially rectangular cross section for bearing said solid portion against the valve gate when in a channel closed position, said ring being housed within a closed chamber defined by said solid portion and said first and second contiguous members, said chamber having two first surfaces (24, 25) parallel to axis X—X and two parallel second surfaces (26, 27) perpendicular to said first surface, said gasket solid portion (15) and flange portion (16) being made of a fluorocarbon polymer material that can be used in a corrosive environment after sintering, whereby said gasket may be used with corrosive fluids, provides substantially axially sized support and is adapted to withstand both upstream and downstream pressures.

2. A gasket according to claim 1, wherein the elastic ring is configured to occupy all of the space in the chamber.

3. A gasket according to claim 1, wherein the thickness of the elastic ring is less than the radial width of the chamber, and a radial clearance (j4) is defined between an outer surface of the elastic ring and an outer surface (24) of the chamber.

4. A gasket according to claim 1, 2 or 3, wherein the axial length of the elastic ring is at least as great as the axial length (L) of a contact surface (20) of the gasket which engages the rotary gate.

5. A gasket according to claim 1, wherein the elastic ring (28) is made of metal.

6. A gasket according to claim 1, wherein the elastic ring (28) is made of a composite material, such as a polymer resin reinforced with glass fiber or carbon fiber.

7. A gasket according to claim 1, wherein the annular flange is radially oriented and surrounds an outer surface (19) of the solid portion of the gasket.

8. A gasket according to claim 1, wherein the annular flange is axially oriented and surrounds a radial lateral surface (18) of the solid portion of the gasket.

* * * * *